United States Patent [19]
Sorce

[11] Patent Number: 5,461,515
[45] Date of Patent: Oct. 24, 1995

[54] ASSEMBLY DEFINING A TETRAHEDRAL GEOMETRY FOR MOUNTING AN OPTICAL ELEMENT

[75] Inventor: Craig J. Sorce, Rochester, N.Y.

[73] Assignee: Eastman Kodak Company, Rochester, N.Y.

[21] Appl. No.: 909,863

[22] Filed: Jul. 7, 1992

[51] Int. Cl.⁶ .......................... G02B 7/182; F16C 11/00; F16D 1/00; F16D 3/00
[52] U.S. Cl. .................. 359/872; 359/896; 403/122; 403/171; 403/217; 248/481; 248/484
[58] Field of Search .................. 403/54, 55, 56, 403/73, 74, 76, 77, 78, 170, 171, 182, 217, 122, 143, 176, 218; 359/224, 225, 811, 871, 872, 896; 248/479, 481, 484

[56] References Cited

U.S. PATENT DOCUMENTS

| | | | |
|---|---|---|---|
| 4,015,806 | 4/1977 | Cattermole | 248/168 |
| 4,372,772 | 2/1983 | Wood | 65/106 |
| 4,655,563 | 4/1987 | Plante et al. | 350/611 |
| 4,959,531 | 9/1990 | Marino | 250/201.9 |
| 5,035,497 | 7/1991 | Itoh | 350/611 |
| 5,079,641 | 1/1992 | Marino et al. | 359/224 |

FOREIGN PATENT DOCUMENTS

| | | | |
|---|---|---|---|
| 651292 | 3/1979 | U.S.S.R. | 359/846 |

*Primary Examiner*—Ricky D. Shafer
*Attorney, Agent, or Firm*—Thomas H. Close

[57] ABSTRACT

An assembly for mounting an optical element, for example, a secondary mirror. The assembly realizes a novel design technique that incorporates a capability for minimizing mass, minimizing the assembly's susceptibility to deleterious, extraneous vibratory perturbations, and reducing design constraints on assembly member angular separation distances. To this end, the assembly comprises a mounting unit frame including six elongated support legs arranged in a tetrahedral geometrical configuration having three supported corners defined by adjacent ends of different groupings of three of the support legs, the supported corners being respectively attached to three mounting units.

8 Claims, 4 Drawing Sheets

ASSEMBLY DEFINING A TETRAHEDRAL GEOMETRY FOR MOUNTING AN OPTICAL ELEMENT

BACKGROUND OF THE INVENTION

1. Field of the Invention

This invention relates to an assembly for mounting an optical element.

2. Introduction to the Invention

My work concerns a problem of mounting an optical element, for example, an efficient mounting of a telescope's secondary mirror. FIG. 1 shows one important way to mount a secondary mirror; thus, a mounting system 10 may include a support structure 12, and a primary mirror 14 positioned on the support structure 12. The mounting system 10 also includes a secondary mirror 16 connected to the support structure 12, by way of a set of six conventional flexure struts 18. Six struts are employed, in order to accommodate the secondary mirror's movement in six degrees of freedom.

SUMMARY OF THE INVENTION

Attention is now directed to FIG. 2, in order to introduce further, particular aspects of the FIG. 1 mounting system 10. FIG. 2, accordingly, details the fact that each of the six flexure struts 18 includes a neckdown portion 20, the neckdown portion 20, in turn, supporting a ball 22 that can mate to a socket 24 defined by a corner mount 26. Note, firstly, that each of the three corner mounts 26 receives a pair of the flexure struts 18. Secondly, each of the three corner mounts 26 is structurally connected by way of a plurality of support legs (numerals 28-38), arranged in a tetrahedral geometry. The secondary mirror 16 may be suspended from the legs (28–38) by flexures 40, in a conventional manner.

A first important design constraint for the FIGS. 1, 2 mounting system 10 is to maintain a kinematic support system, which implies a six strut approach. In turn, a kinematic support system may require a minimal angular separation $\theta$ between associated pairs of flexure struts 18. This follows from the fact that, in large mounting systems, the primary and secondary mirrors are spaced apart over relatively large distances, thus defining the minimum angular separation $\theta$.

I have ascertained that the requirement of a minimal angular separation $\theta$ between associated flexure struts 18, may induce a further design constraint. Thus, to accommodate a minimal angular separation $\theta$, one may be obliged to increase the mass, M, of each of the three corner mounts 26, for example, in order to adequately accommodate and support the ball-ends 22 of the flexure struts 18.

A second important design constraint for the FIGS. 1, 2 mounting system 10 is to minimize the primary and secondary mirrors' susceptibility to transient, spurious, and extraneous vibratory perturbations that may be incurred by the mounting system 10. For example, a lateral vibratory perturbation to one of the legs (28-38) may be propagated so as to generate a deleterious twisting or rotating moment at the ball 22-socket 24 location, which rotating moment, in turn, may, in a worst case scenario, dislodge the ball 22 from the socket 24. This last action, clearly, may upset primary and secondary mirror positioning. Thus, the significance of the second design constraint is to accommodate vibratory perturbations, so as to provide and maintain a desired mirror position.

An important design technique, to the end of minimizing the primary and secondary mirrors' susceptibility to vibratory perturbations, is to increase a spring stiffness K of the mounting system 10, and/or, to decrease its mass, M. This design technique is in accordance with equation (1):

$$\text{Vibration of Mounting System} \quad \alpha \sqrt{\frac{K}{M}}. \tag{1}$$

If one now summarizes the above first and second design constraints, it becomes clear that, on the one hand, a minimal angular separation $\theta$ between pairs of flexure struts 18, may require an increase in mass, M, of the mounting system 10; on the other hand, a desired system immunization to vibratory perturbations, may require a sharp reduction in mounting system mass, M, in accordance with equation (1). In combination, therefore, the first and second design constraints may require different, indeed, antagonistic solutions, or lead to an undesirable, compromised solution. For example, in satisfaction of the vibration problem, one may reduce the mass M of the corner mounts 26 by the process of "light-weighting" them, i.e., selectively boring holes in them. However, the process of light-weighting may work against the stiffness maximization objective.

I have now discovered a novel design technique that addresses the first and second design constraints disclosed above. First, the novel design technique of the present invention incorporates a capability for significantly reducing the mass M of the mounting system, thus minimizing the system's susceptibility to deleterious vibratory perturbations. In addition, the novel technique incorporates a capability for maintaining a high axial stiffness K, required for desirable vibratory modes. This capability has an advantage of eliminating the effects that may be caused by the process of light-weighting.

In a first aspect, the novel design technique of the present invention is realized in a mounting assembly comprising:

1) three mounting units, wherein each of the mounting units comprises:
   a) a ball receptacle capable of engaging a ball;
   b) a ball engaged by the ball receptacle, the ball defining a hole;
   c) an adapter comprising
      (i) a stud inserted into the hole defined by the ball and connecting the adapter to the ball;
      and
      (ii) two receptacles;
   d) a retaining ring retaining the ball to the receptacle;
2) a support structure;
3) a mounting unit frame comprising six elongated support legs arranged in a tetrahedral geometrical configuration having three supported corners defined by adjacent ends of different groupings of three of the support legs, the supported corners being respectively attached to the mounting units at the ball receptacles; and
4) six elongated flexure struts having first ends connected to the support structure and second ends respectively connected in pairs at fixed angular separations $\phi$ to the mounting units at different ones of the receptacles.

In a second aspect, the present invention discloses an assembly for mounting an optical element for six-degree of freedom movement relative to a support structure, the mounting assembly including a plurality of elongated flexure struts having first ends connected to the support structure and second ends connected in pairs by ball and socket means to supported corners formed by adjacent ends of a plurality of elongated support legs arranged in a geometrical configuration to which said optical element is attached, the improvement comprising:

a corner assembly including a ball receptacle member defining a single socket, a ball member defining a single ball received for rotation within the socket, and means for retaining the ball within the socket;

the second ends of a pair of the flexure struts being attached in fixed angular separation φ to one of the ball receptacle member and ball member; and the adjacent ends of at least two of the support legs at one of the supported corners of the geometrical structure being attached in fixed relationship to the other of the ball receptacle member and ball member.

In a third aspect, the present invention discloses an assembly for mounting an optical element, comprising:

a support structure;

a plurality of elongated support legs arranged in a geometrical configuration having three supported corners defined by adjacent ends of the support legs;

a corner assembly located at each supported corner of the geometrical configuration; and a plurality of elongated flexure struts having first ends connected to the support structure and second ends connected to the corner assemblies;

each corner assembly including a ball receptacle member defining a single socket, a ball member defining a single ball received for rotation within the socket, and means for retaining the ball within the socket;

the second ends of the flexure struts being attached in pairs at fixed angular separations φ to respective ones of ones of the ball receptacle member and ball member of the corner assemblies; and the adjacent ends of the support legs defining each supported corner being respectively attached in fixed relationship to ones of the others of the ball receptacle member and ball member of the corner assemblies.

BRIEF DESCRIPTION OF THE DRAWING

The invention is illustrated in the accompanying drawing, in which.

DETAILED DESCRIPTION OF THE INVENTION

Figure 3:
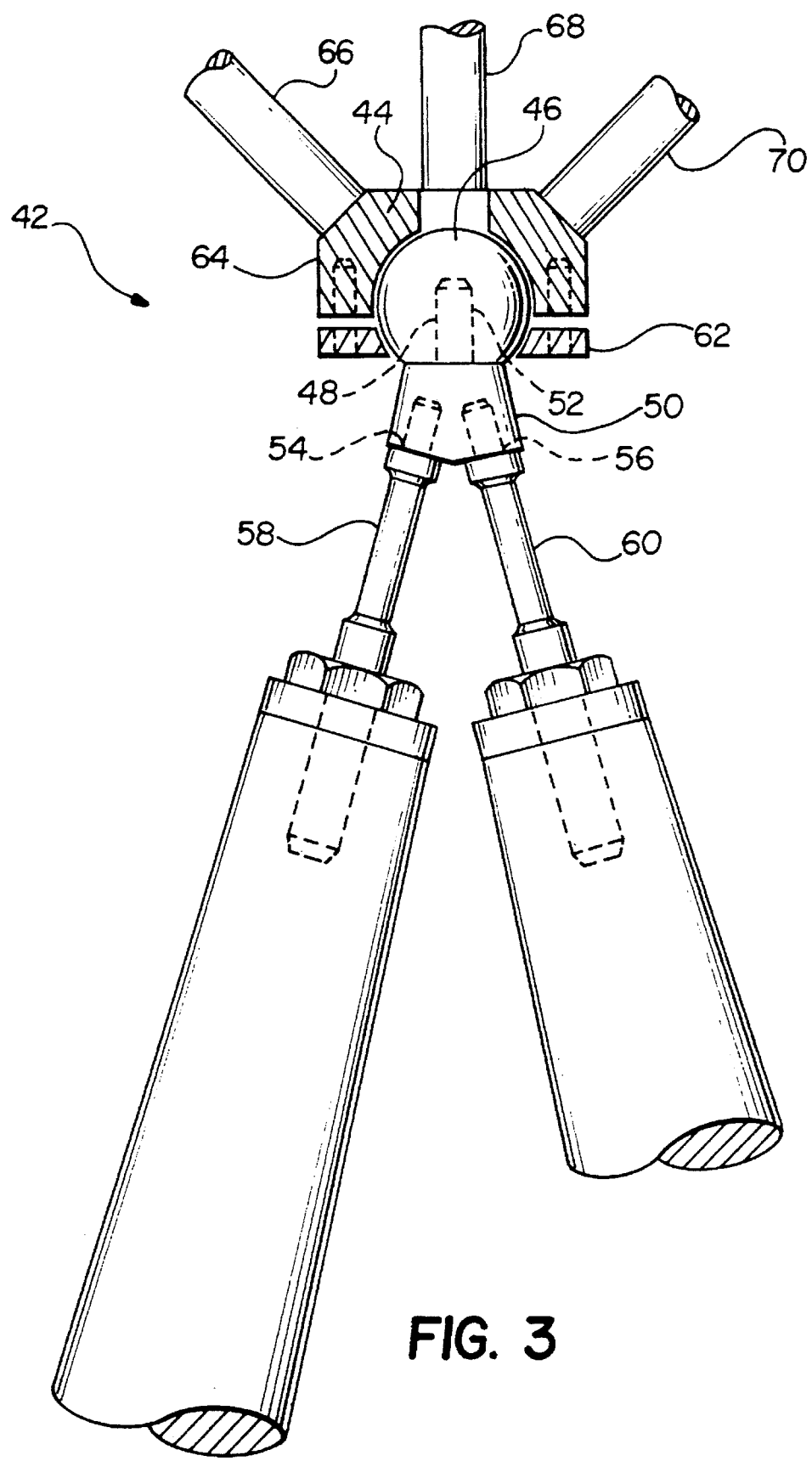
FIG. 3 shows a canonical mounting assembly of the present invention.

Attention is now directed to FIG. 3, which shows a canonical mounting assembly 42 of the present invention.

The mounting assembly 42 preferably comprises a conventional ball receptacle 44, typically of radius from 0.5 cm to 10.0 cm, and capable of engaging a ball 46 in a conventional ball and socket arrangement. The ball receptacle 44 preferably comprises steel, but may comprise Invar. The ball 46 preferably comprises steel, although it may comprise Invar, and is appropriately sized in relation to the ball receptacle 44. The ball 46 has a hole 48 which is capable of securing an insertable member.

The mounting assembly 42 further comprises an adapter block 50, preferably comprising Invar. The adapter block 50 comprises a stud 52 which is insertable into the hole 48, for connecting (e.g., screwing) the adapter block 50 to the ball 46. The adapter block 50 also comprises first and second receptacles 54, 56, each of which receptacles can engage a conventional flexure strut (58, 60).

Note that, heretofore, the mounting assembly 42 has been characterized as comprising individual components, namely, the ball receptacle 44, the ball 46, and the adapter block 50. While it is preferred to assemble individual components, it is possible to machine the individual components as one monolithic device.

The mounting assembly 42, finally, comprises a steel retaining ring 62 for retaining the ball 46 in the ball and socket arrangement with the ball receptacle 44. The retainment may be realized by a conventional nut and bolt assembly 64.

Figure 4:
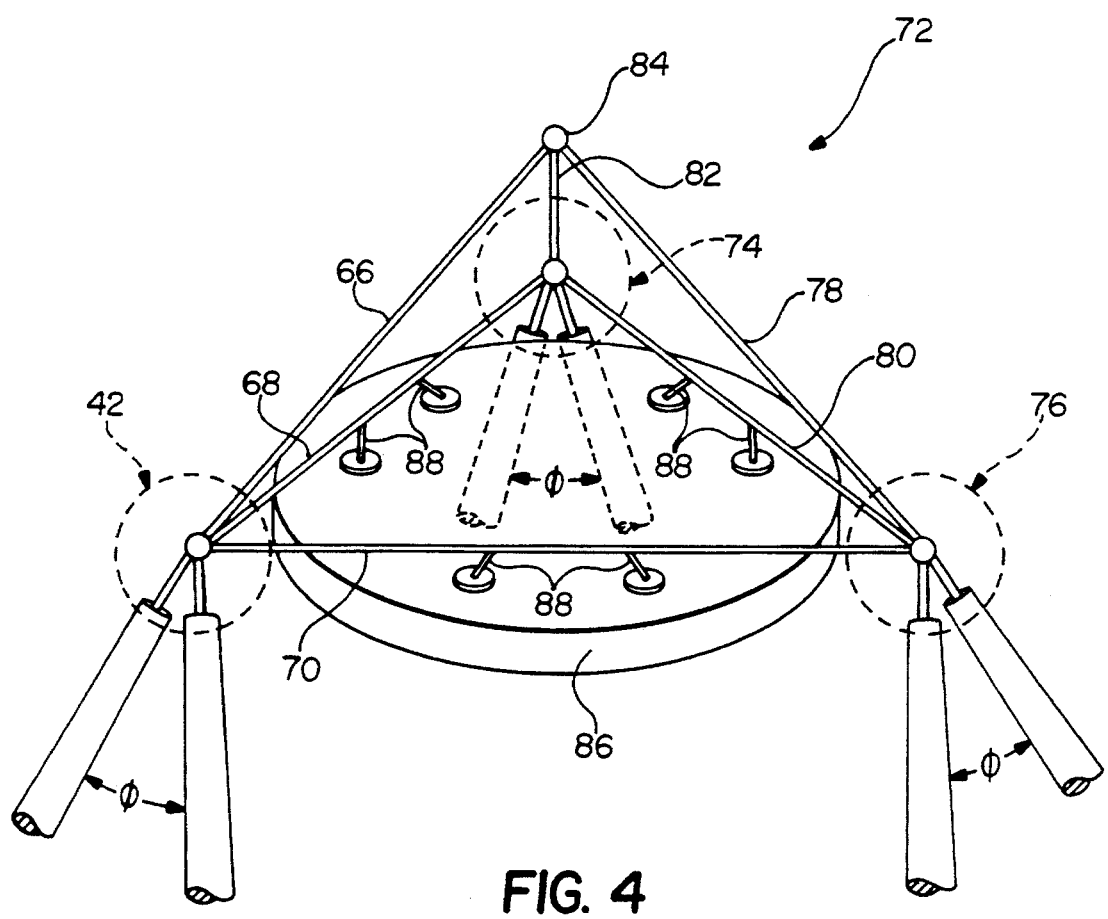
FIG. 4 shows the FIG. 3 canonical mounting assembly employed in a mounting frame.

FIG. 3 further shows that the mounting assembly 42 has three legs (66-70) welded to the ball receptacle 44. The three legs (66-70) form part of a mounting frame, for which the FIG. 3 canonical mounting assembly 42 may be advantageously employed. FIG. 4, to which attention is now directed, shows one such mounting frame 72.

In overview, the FIG. 4 mounting frame 72 comprises three mounting assemblies 42, 74, 76, with the mounting assemblies 42, 74, 76 being connected by the first set of legs 66-70, and a further set of legs 78, 80, 82. Note firstly that a numeral 84 indicates where the legs 66, 78 and 82 may be jointly welded; and, that a secondary mirror 86 is suspended from the legs by flexures 88, in a conventional manner.

Figure 1:
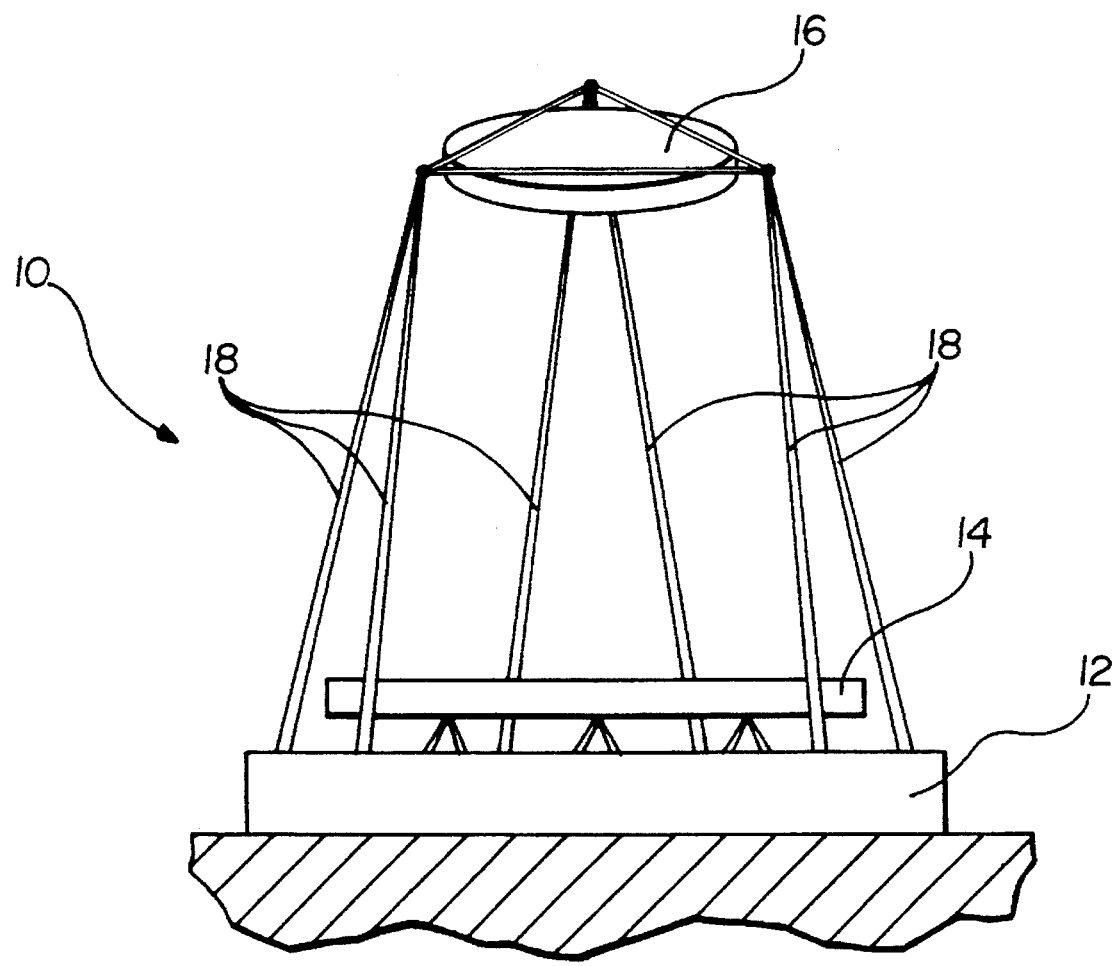
FIG. 1 shows a mounting system for an optical element.
Figure 2:
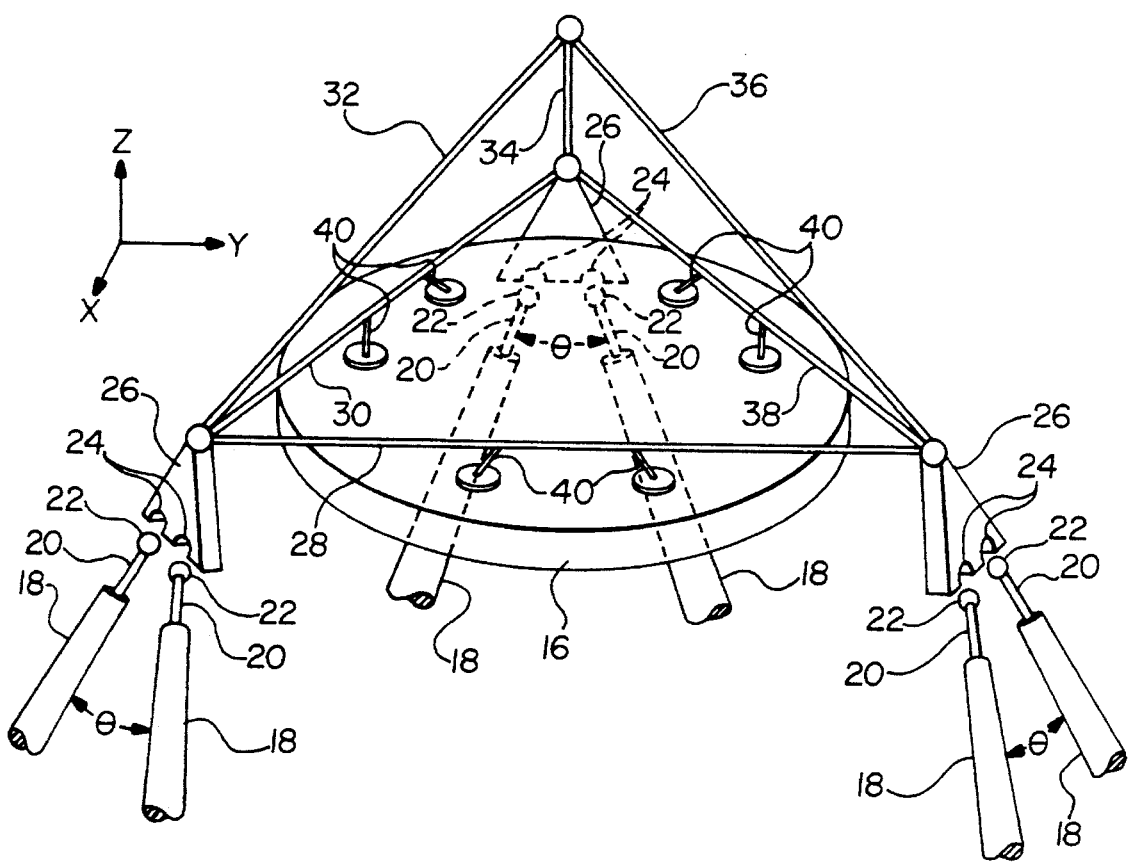
FIG. 2 introduces further, particular details of the FIG. 1 mounting system.

The mounting frame 72 comprising the three mounting assemblies 42, 74 and 76 of the present invention, may be advantageously compared to the FIG. 2 mounting system 10.

First, it may be observed that a virtue of the FIG. 2 six ball design, namely, that it is a strain free design, is preserved in the FIG. 4 design. At the same time, moreover, the FIG. 4 mounting frame realizes an efficient, simple design, in that there are now only three mounting points, compared to the FIG. 2 six mounting points.

Second, the FIG. 4 design provides a substantial reduction in mass, in part because the relatively massive FIG. 2 corner mounts 26 have been eliminated in favor of the FIG. 4 adapter block 50 design. Note that, concomitant with the reduction of mass, comes an enhanced robustness, and an increased immunization to deleterious, extraneous vibratory perturbations.

Third, the FIG. 4 design can accommodate arbitrarily small angular separations φ between associated pairs of flexure struts, without attendant increases in support mass. This advantage is realized inter alia by way of the FIG. 4 ball 46, which can uniquely receive an associated pair of flexure struts, independent of an angle φ defined by the flexure struts.

Fourth, the FIG. 4 design is such that a force line of action of all the frame members, i.e., the legs 66-70, 78-82, passes through the center of the ball 46. Restated, the force line of action between all the legs which make up the FIG. 4 frame, intersect at a common point, i.e., at the center of the ball 46, thus resulting in a design of higher axial stiffness K and superior vibration immunization. Accordingly, the FIG. 4 design is such that there are no induced moments into the secondary mirror. It was shown above, in contrast, that the FIG. 2 design, may, in a worst case scenario, respond to lateral vibratory perturbations in such a manner as to generate a deleterious rotating moment at the ball-socket location.

What is claimed:

1. A mounting assembly for an optical element comprising:
1) three mounting units, wherein each of the mounting units comprises:
   a) a ball receptacle capable of engaging a ball;
   b) a ball engaged by the ball receptacle, the ball having a hole;
   c) an adapter comprising:
      (i) a stud inserted into the hole and connecting the adapter to the ball; and
      (ii) two receptacles;
   and
   d) a retaining ring retaining the ball to the ball receptacle;
2) a support structure;
3) a mounting unit frame comprising six elongated support legs arranged in a tetrahedral geometrical configuration having three supported corners defined by adjacent ends of different groupings of three of the support legs, the supported corners being respectively attached to the mounting units at the ball receptacles; and
4) six elongated flexure struts having first ends connected to the support structure and second ends respectively connected in pairs at fixed angular separations $\phi$ to the mounting units at different ones of the receptacles.

2. A mounting assembly according to claim 1, wherein the ball receptacle comprises steel.

3. A mounting assembly according to claim 1, wherein the ball receptacle has a radius from 0.5 cm to 10.0 cm.

4. A mounting assembly according to claim 1, wherein the ball comprises steel.

5. A mounting assembly according to claim 1, wherein the adapter block comprises Invar.

6. A mounting assembly according to claim 1, wherein the ball receptacle, the ball and the adapter block, serves as a monolithic device.

7. A mounting assembly according to claim 1, wherein the retaining ring comprises steel.

8. A mounting assembly as in claim 1, wherein the ball has a center, the pairs of second ends of the flexure struts converge at the angular separation $\phi$ along center lines that pass through the center of the ball, and the adjacent ends of the base corner support leg groupings converge along center lines that also pass through the center of the ball.

\* \* \* \* \*